United States Patent [19]
Carter et al.

[11] Patent Number: 5,969,247
[45] Date of Patent: Oct. 19, 1999

[54] ELECTRONIC WHEEL BALANCER WITH VARIABLE SPEED OPERATION, IMPROVED OPERATOR INTERFACE, AND AUXILIARY STORAGE

[75] Inventors: Ronald W. Carter, Murfreesboro; Jerry M. Hill, Brentwood, both of Tenn.

[73] Assignee: Wheel Service Equipment Corporation, Wilmington, Del.

[21] Appl. No.: 09/004,490

[22] Filed: Jan. 8, 1998

[51] Int. Cl.[6] ....................................................... G01M 1/16
[52] U.S. Cl. ................................................ 73/462; 73/460
[58] Field of Search .................... 73/460, 462; 301/5.21, 301/5.22; 702/56

[56] References Cited

U.S. PATENT DOCUMENTS 4,435,982  3/1984  Borner et al. .............................. 73/462

OTHER PUBLICATIONS

Precision Wheel Balancer Model CA200 by Chrisáron, Inc., Lake Forest, IL, 1994, 4 Pages.
Vibration Control System GSP 9700 by Hunter Engineering Company, Bridgeton, MO, 1997, 8 Pages.
EM43 Wheel Balancer by Corghi, 2 Pages. (Not Dated).

*Primary Examiner*—John E. Chapman
*Attorney, Agent, or Firm*—Waddey & Patterson; Mark J. Patterson

[57] ABSTRACT

An electronic wheel balancer performs imbalance measurements at variable speeds for different size wheels. The inertia of a wheel mounted on the balancer is determined by measuring the acceleration time of the wheel from a first speed to a second higher speed and the operating speed is adjusted accordingly. An improved operator interface pod incorporates correction plane indicators/selection buttons adjacent the weight display. Auxilliary weight storage is also provided.

6 Claims, 12 Drawing Sheets

ELECTRONIC WHEEL BALANCER WITH VARIABLE SPEED OPERATION, IMPROVED OPERATOR INTERFACE, AND AUXILIARY STORAGE

BACKGROUND OF THE INVENTION

The present invention relates generally to wheel balancing machines used by tire shops and motor vehicle repair shops to perform off-vehicle balancing of automobile and truck tire and wheel assemblies. More specifically, this invention relates to a motorized electronic wheel balancer which is capable of operating at varying speeds of rotation and that has additional operator interface features that allow a user of the balancer to operate it with greater safety and efficiency.

In a conventional electronic wheel balancer, the tire and wheel assembly to be balanced is removed from the vehicle and placed on a shaft that extends laterally from the wheel balancer chassis. The shaft is directly or indirectly coupled to an electric drive motor so that the shaft as well as the tire and wheel assembly can be rotated to a predetermined speed. Once the wheel and tire assembly has been rotated to the predetermined speed, imbalance force transducers mechanically linked to the shaft and motor send electrical signals to a processor which are responsive to mechanical imbalances in the tire and wheel assembly. After these signals are processed, visual indicators are typically provided to the operator, identifying an amount of compensating weight that should be added to the tire and wheel assembly, as well as identifying a location or locations where correction weights should be attached.

In such wheel balancing machines, it is often desirable to operate the balancer at multiple shaft speeds. For example, it would be preferable to rotate the shaft at a slower speed for large wheels having high inertia as well as to operate at a higher speed for smaller wheels with lower inertia. This prevents overheating of the balancer drive motor on large wheels and improves the cycle time and signal to noise ratio in the collection of imbalance data for smaller wheels.

Another basis for operating the balancer at varying speeds would be to allow the operator to select a speed at which he wished to balance the wheel. Under these circumstances, the operator would select the speed. Then, as the shaft accelerated, the forces being generated by the imbalance in the tire and wheel assembly would be monitored. If the imbalance forces generated were low enough to allow for safe operation at the selected speed, the shaft would be accelerated to the desired speed and the imbalance measurement made. However, if excessive imbalance forces were detected, the power would be removed from the drive motor at a safe speed and the measurements made at that speed.

Finally, variable speed operation is also desirable to allow the operator to rotate the tire and wheel assembly at a speed low enough to permit visual inspection of the rotating tire. For safety reasons, Underwriters Laboratories requires that if the tire and wheel assembly is rotated at or above specified speed, the assembly must be covered by a protective hood. Thus, the safety hood, which ordinarily covers the assembly for the protection of the operator, must be in its upward position to allow for visual inspection of the wheel runout or other aberrant conditions that must be visually detected. After the operator has completed the runout inspection, he could stop the drive motor or lower the hood and the balancer could then be accelerated to a higher speed to conduct a normal imbalance measurement.

Another important characteristic of an electronic wheel balancer is to quickly and effectively display to the operator the precise locations for placement of the compensating weights. In the prior art, this is has been accomplished by various combinations of display or illumination devices on a display panel mounted to the balancer. One problem associated with the prior art display panels in a multi-planed electronic wheel balancer is the relationship between weight placement and the multiple correction planes that can be selected in balancing a tire and wheel assembly. In the typical microprocessor based electronic wheel balancer, the imbalance in a wheel is resolved into two correction planes. In the variety of vehicle wheels that can be used, there are many different correction planes where corrective weights can be applied, with five of such planes shown in FIG. 6. The operator ordinarily will select the weight placement planes in advance, based on several factors. The processor of the balancer will use this information, along with the imbalance force measurements, to calculate weight placement locations. In the prior art user interface and display panels, the steps of operator selection of the correction planes (by use of a selection key or button) and visualization of weight placement can be confusing because of poor arrangement of the buttons and display.

In balancing a standard steel wheel, knowing where on the wheel to apply the correction weights is straightforward. Clip weights are attached to the wheel rim at the required angular position as specified by the electronic wheel balancer display. The situation becomes more complicated if an alloy wheel is being balanced. It may be impossible to attach a clip weight to the rim of the wheel or the vehicle owner may want the weights to be hidden from view. In those situations, one or both weights may be placed on the interior of the wheel when performing a dynamic balance. The weights may be a combination of clip weights and tape weights or both may be tape weights.

Various methods have been tried in the prior art to allow the operator to select the weight location, all of which have had some drawbacks. One method has been to provide selectable icons on the operator interface panel, each of which represents a specific wheel configuration as well as corresponding weight locations. Another method has been to have a graphic display and a series of switches on the operator panel which allow selection of fixed groupings of weight locations. Both of these methods suffer from inflexibility and are not user friendly.

What is needed, then, is an electronic wheel balancer that can be safely operated at variable speeds for different sized wheels. An electronic wheel balancer is also needed that has an improved operator interface panel to make it easier and less confusing to coordinate the selection of correction planes with visualization of weight placement location.

SUMMARY OF THE INVENTION

The wheel balancer of the present invention uses a processor and motor controller that provides variable shaft rotation speeds. The speed of rotation of the shaft is adjusted automatically in relation to the inertia, and therefore size, of the wheel. In accordance with a novel feature of the invention, the inertia of the wheel or size of the wheel is determined by measuring the elapsed time from shaft start-up (or other predetermined first lower speed) up to a predetermined second speed of rotation. If the elapsed time measured indicates a large wheel, then the proper operating speed, 200 RPM for example, is determined by the processor and the shaft is accelerated to the appropriate speed. If the elapsed time measured indicates a smaller wheel, then the processor determines a higher proper operating speed and accelerates the motor to the desired speed, 300 RPM for example. In addition, the operator has the choice of indicating a desired operating speed in advance and/or a speed that will permit a visual inspection of the rotating tire and wheel assembly, at less than a specified safe speed.

The wheel balancer of this invention also has an improved operator interface panel. The panel includes correction plane selection switches which have graphic and illuminated indicators mounted adjacent thereto. The indicators can be LED's, incandescent lamps, or other visual displays. The indicators are used to show the locations that the operator has chosen for weight location, corresponding to the various correction planes. The operator has considerable freedom in choosing the weight locations. If the operator chooses a combination of weight locations that would not result in an accurate balance, the operator is warned by the processor that a satisfactory balance may not be possible. In addition, the balancer then suggests that the operator perform a static balance. However, the operator is allowed to proceed with dynamic balance. An example of such a condition would be if the operator has chosen two planes close together.

The correction planes selected on the operator interface panel also indicate to the balancer processor computer which types of weights are being used so that corrections for weight center of gravity can be automatically performed. A wheel parameter display automatically changes based on the weight location selection as required, that is, the distance, width, inside distance, inside diameter, outside distance, and outside diameter.

In the prior art, various limited options have been provided for storage of wheel weights used in conjunction with wheel balancer machines. Typically, wheel weight manufacturers offer ten variations of weight styles and coatings for automobile wheel weights. In order to satisfy all of the weight applications, a typical tire or repair shop would stock a common wheel weight on a balancer weight tray and have a shelf with specialty weights located somewhere else in the shop. When an occasional alloy wheel requires one of the specialty weights, the technician would balance the wheel to determine the weight needed, go to the shelf and locate the specific weight, return to the balancer, and apply the weight. This process would be repeated for each tire. The technician could not pick out the weights for all of the tires in advance due to the unpredictable results from balancing the wheel. All wheels are unique in their respective balance correction requirements.

The wheel balancer of the present invention provides a novel answer to the problem of storing multiple styles and sizes of weights at the balancer. A weight tray mounted to the top of the balancer chassis is designed to accept two styles of weights in the two most common ranges (0.25 ounces to 2.5 ounces). Each style has a pocket designated with a coded label and the two styles are segregated from one another for easy selection. For further weight storage capacity, a second tray is sidably mounted or stacked on the top weight tray. The weight tray is designed to allow front to back sliding movement of the sliding weight tray so that the weight pockets under the sliding tray can be easily accessed.

Optionally, in a second embodiment of the wheel balancer of this invention, storage for the cones used to mount the tire and wheel assemblies to the balancer is provided at eye level, in the operators immediate work area but off of the weight tray. A panel is mounted to a tube that extends upwardly at the rear of the balancer chassis. Storage pegs extend outwardly toward the front of the chassis from the storage panel. The various cones used to mount the various tire and wheel assemblies are then placed in a convenient fashion on the pegs.

Finally, the wheel balancer of this invention is equipped with side storage trays mounted to and extending out from the side of the wheel balancer chassis.

DESCRIPTION OF THE PREFERRED EMBODIMENTS

Figure 1:
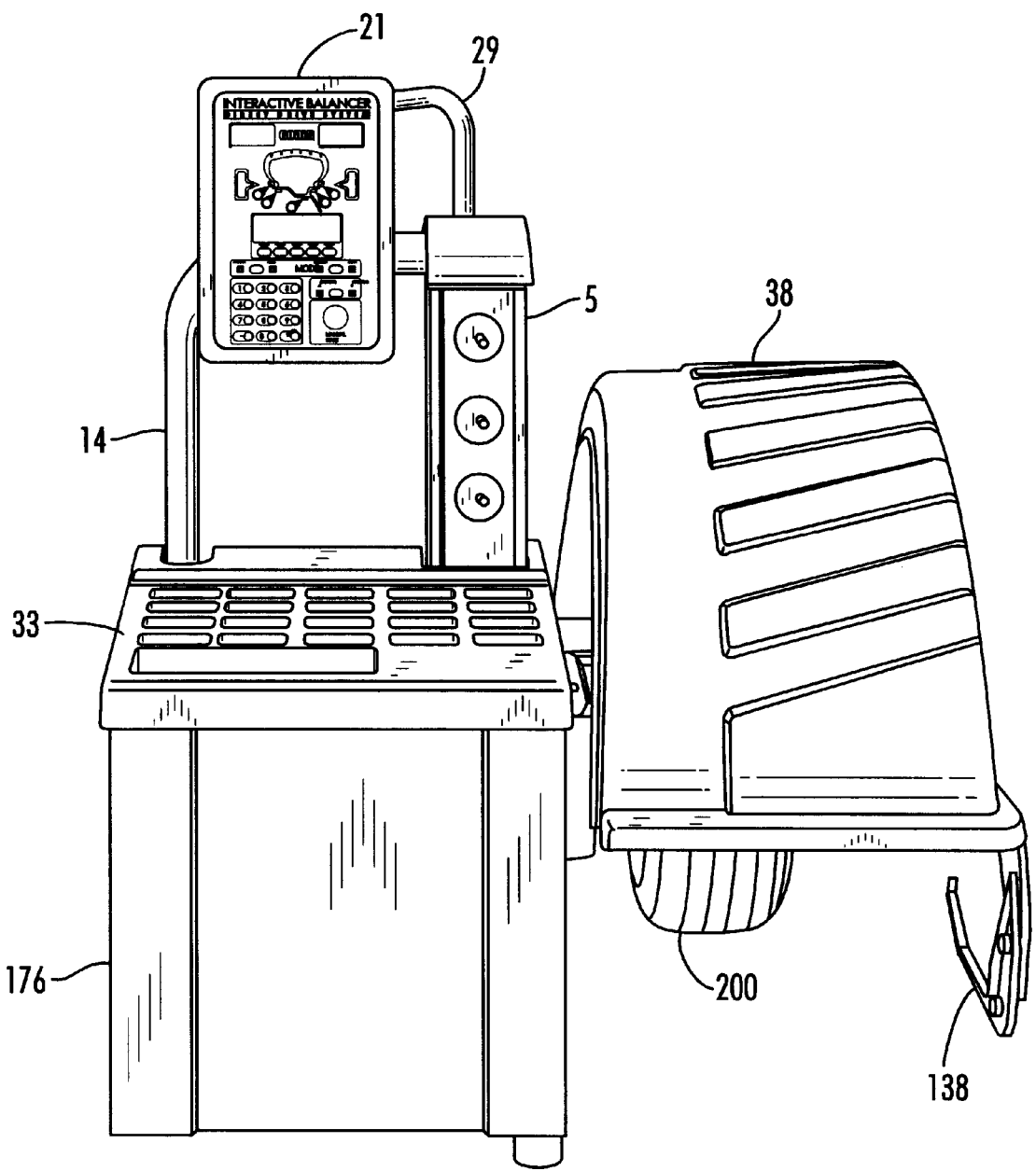
FIG. 1 is a front perspective view of a first embodiment of the wheel balancer of the present invention.
Figure 3:
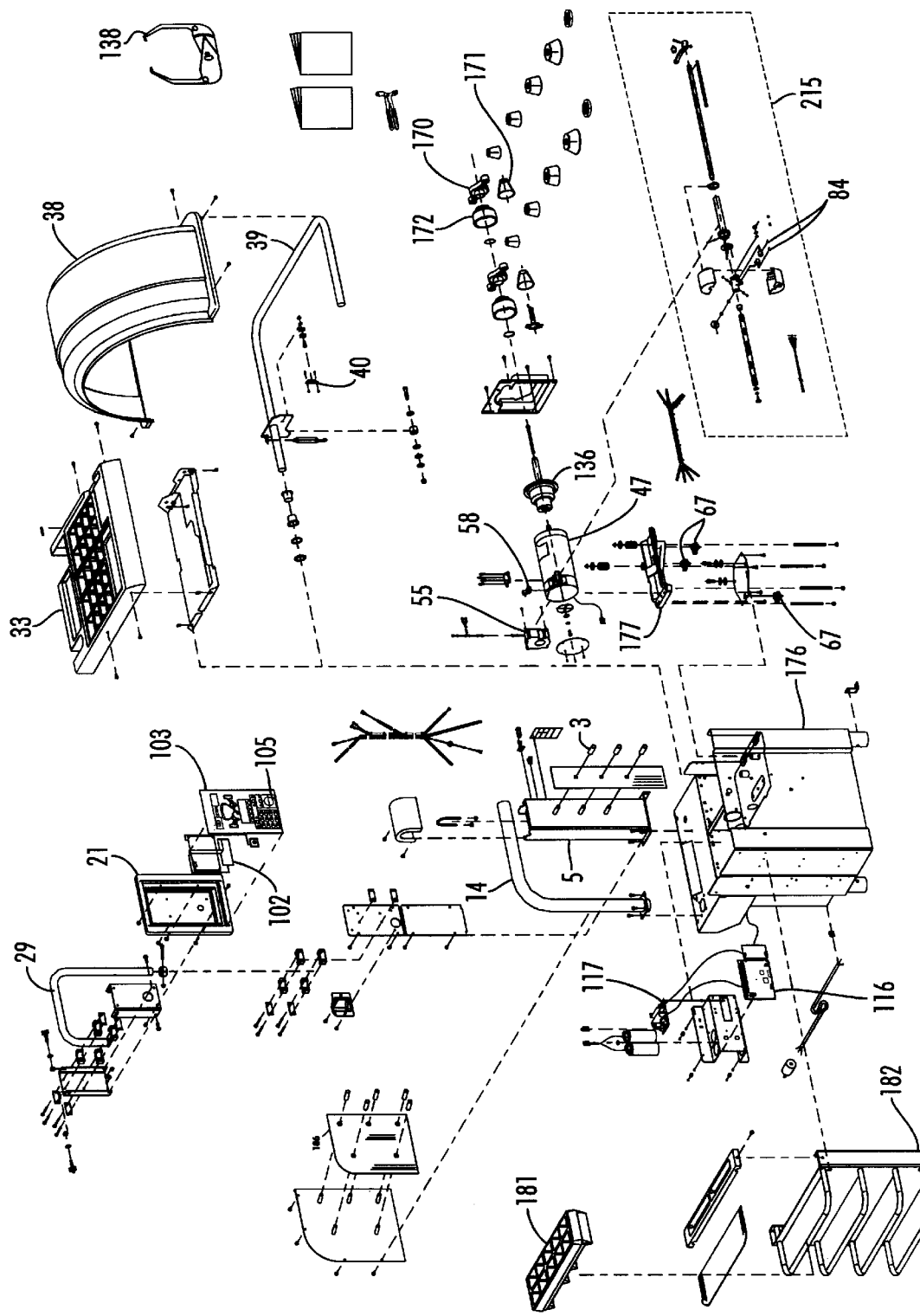
FIG. 3 is an exploded view of the wheel balancer of FIG. 1.

FIGS. 1 and 3 illustrate a first embodiment of the wheel balancer 10 of the present invention. A chassis 176 encloses an electric motor 47 (FIG. 3). The shaft of the motor 47 is connected to a face plate and stub shaft assembly 136, with the shaft portion of the assembly 136 extending outwardly from the right side of the chassis 176. During balancing, a tire and wheel assembly 200 is mounted to the shaft 136 in a conventional manner using either a back cone 171 or pressure cup 172, and secured with a hub nut 170.

As required by various safety standards organizations, a protective hood 38 covers the upper portions of the tire and wheel assembly 200 during high speed rotation of the wheel.

A weight tray 33 is mounted to the top of chassis 176 so that some of the various styles and sizes of weights can be stored at the balancer 10 for use by the operator.

Extending upwardly from the right rear portion of the top of the chassis 176 is a column 5 which is supported, in turn, by a right angle tube assembly 14 that extends upwardly from the left rear of the chassis 176. The front surface of column 5 can be provided with horizontal storage pegs 3 (FIG. 3) so that cones 171 of different configurations can be conveniently stored.

Extending upwardly from the top of column 5 is an adjustable pod tube 29, supporting an operator interface pod 21.

Figure 4:
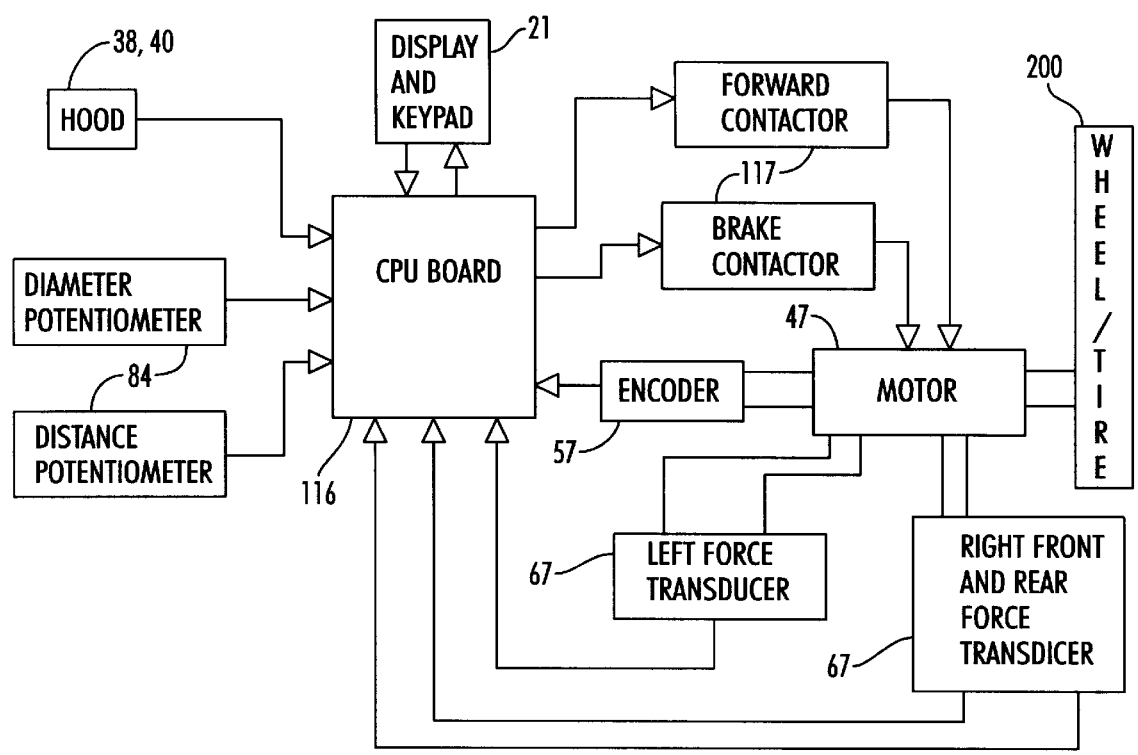
FIG. 4 is a block diagram of the electronic and electromechanical components of the wheel balancer of the present invention.

Further detail about the electric and electronic components of the wheel balancer 10 is shown in FIGS. 3 and 4. The motor 47 is supported by a cradle and dampener assembly 177. In a conventional manner, multiple imbalance force transducers 67, such as piezoelectric crystals, are mechanically connected to the cradle 177 so that imbalance forces induced along the shaft 136 and through the motor 47 by a mounted tire and wheel assembly 200 are transmitted to the sensors 67 and converted into electrical signals. These imbalance force signals are then communicated to a main processor board 116 where they are used, again in a conventional manner, to calculate the magnitude and location of imbalance in the tire and wheel assembly 200. A variety of calculation techniques are known to those of skill in the art. For example, U.S. Pat. No. 4,423,632, incorporated herein by reference, describes one example of calculation techniques and algorithms for determining weight magnitude and placement information from force imbalance signals produced along a rotating shaft that supports a wheel and tire assembly.

The main processor board 116 also electrically communicates and provides signals to a motor controller 117 which, in turn, starts, stops, accelerates, and decelerates motor 47 in accordance with instructions from processor board 116. Of course, the operator interface pod 21 includes electrical connections to the main processor board 116 so that information can be entered by the operator at pod 21 and electrically communicated to the main processor board 116. Also, visual displays and other indicators on the operator interface pod 21 are controlled as well by the main processor board 116.

As can be seen in FIG. 3, the safety hood 38 is attached to a pivoting hood bar 39 which extends outwardly from the right side of chassis 176. A safety interrupt switch 40 is mechanically connected to the hood bar 39 so that the main processor board 116 knows whether the hood 38 is in the up or down position. A potentiometer assembly 84 is provided, again in conventional manner, so that the operator of the balancer 10 can electrically communicate to the main processor board 116 the wheel diameter (D) and the distance (A) from a reference point inside the balancer 10 to an inside balance plane on the wheel, as measured by calipers 138.

Figure 5:
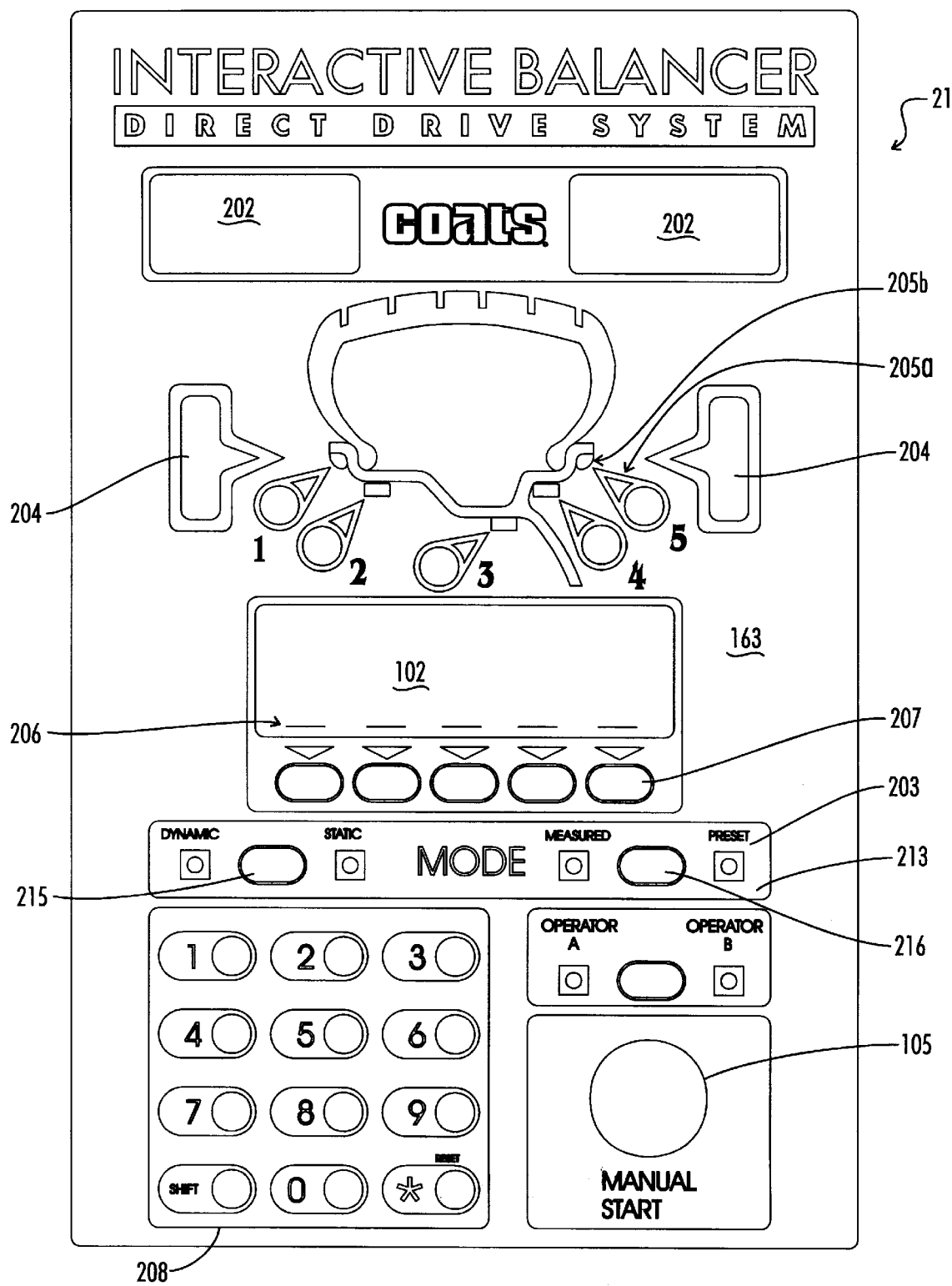
FIG. 5 is an enlarged view of the improved operator interface pod and panel used with the wheel balancer of the present invention.
Figure 6:
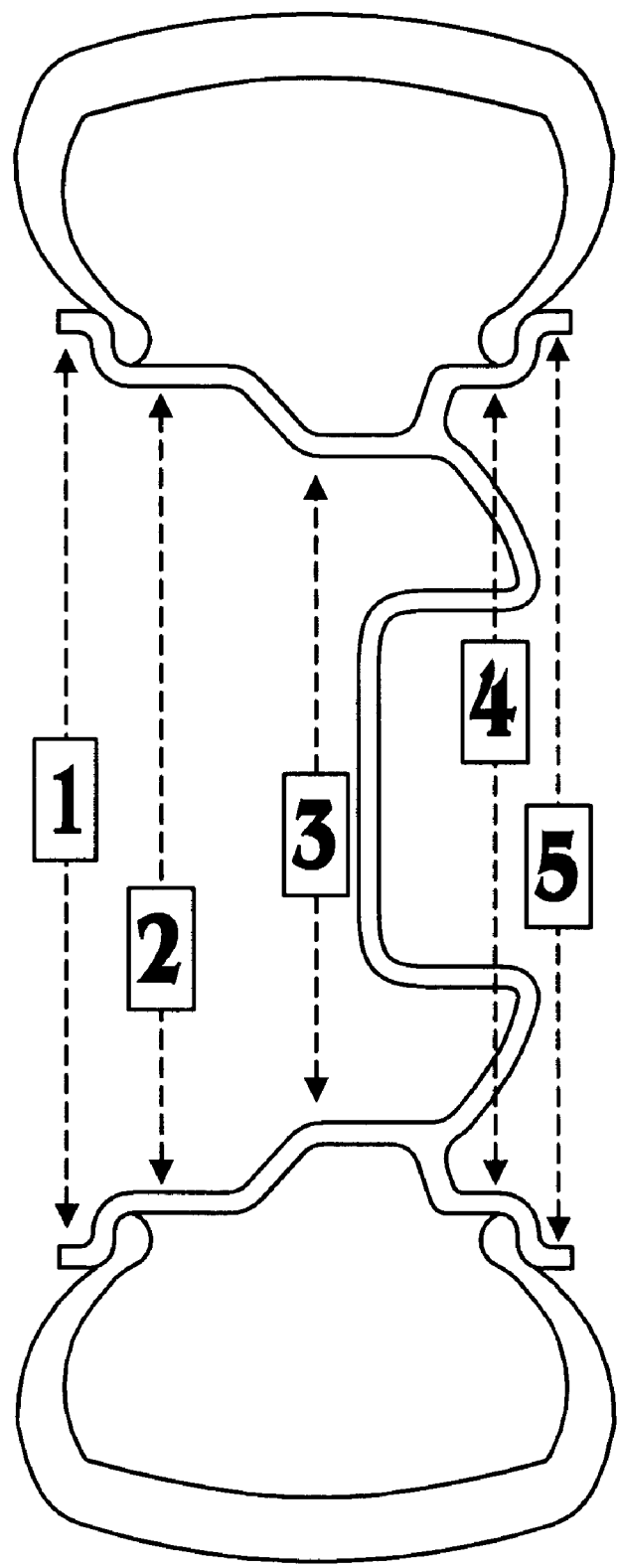
FIG. 6 is a diagram of the typical five correction weight location planes corresponding to various conventional truck and automobile wheel rims.

FIG. 5 provides additional detail about the novel operator interface pod 21 of the present invention. A touch panel sub-assembly 103 covers the front of the pod 21. All necessary operator controls and displays are mounted to or are visible from touch panel 103. Thus, a pair of weight displays 202 are provided to indicate the magnitude of the weights that must be attached to the wheel to correct the measured imbalance. Displays 204 indicate the angular position of the wheel where the weights must be attached. Area 203 of the panel 103 corresponds to and graphically represents the various shapes of typical wheel rim assemblies, as also seen in FIG. 6. Novel correction plane location indicator/selection button assemblies 205a provide a means for the operator to select the correction planes where weights will be applied. These planes correspond to those shown on FIG. 6.

An interactive display screen 102 provides visual prompts and information to the operator as a balance procedure is being performed. The prompts on display screen 102 are associated with a series of control buttons 207. The prompts can change so that the functions of the buttons 207 can vary depending on the operational mode and status of the balancer 10. These are known to those skilled in the art as "soft keys." Preferably, the display panel 102 will be a graphic liquid crystal display (graphic LCD) which provides the visibility of a more expensive cathode ray tube (CRT) display but at a significantly lower cost.

The lower portion of the front panel 103 of the operator interface pod 21 includes a keypad 208 to allow the operator to enter data and other commands. A mode display panel 213 indicates to the operator in which mode the balancer 10 is currently operating: dynamic, static, measured, or preset. Finally, a manual start switch 105 allows the operator to manually start the drive system of the balancer 10.

Correction Plane Selection

In accordance with a novel feature of the present invention, the wheel balancer 10 allows the operator to use preset weight location (correction plane) measurements or custom location measurements. This allows for increased accuracy in alloy wheels and when using hidden weights. The operator interface panel and display assists in this process by visually presenting to the operator an accurate spatial relationship between the correction plane selections and the actual location on the wheel where the operator will place the weights. The flow chart of FIGS. 11(a)–(c) describes the steps carried out by the balancer 10 during operator selection of the correction planes, using the operator interface pod 21 and front panel 103, as best seen in FIG. 5.

The operator first selects (using mode button 216 on FIG. 5) either the PRESET or MEASURED mode. When using preset measurements using the PRESET mode, the operator enters the standard wheel offset (A), wheel diameter (D), and wheel width (W) measurements at keypad 208. After these measurements are entered, weight location calculations are made by the main processor board 116 based upon wheel profile data present in the processor memory. These calculations allow the main processor board 116 to display weight information for the correction planes that have been selected by the operator using location indicators/selection buttons 205 (numbered 1–5 on FIG. 5 to correspond to the correction planes on FIG. 6 and to "keys" 1–5 on FIG. 11(a)). Note that when the operator depresses the key section 205a, its corresponding LED 205b is energized (numbered "LED" 1–5 on FIG. 11a). This assists the operator in making a visual connection between the selections made and actual positions on the wheel.

Once the A, W, and D measurements are entered, the operator may select any of the five weight correction planes and the processor on the main processor board 116 will calculate and display the calculated weight amounts to be attached at those locations.

Figure 11A:
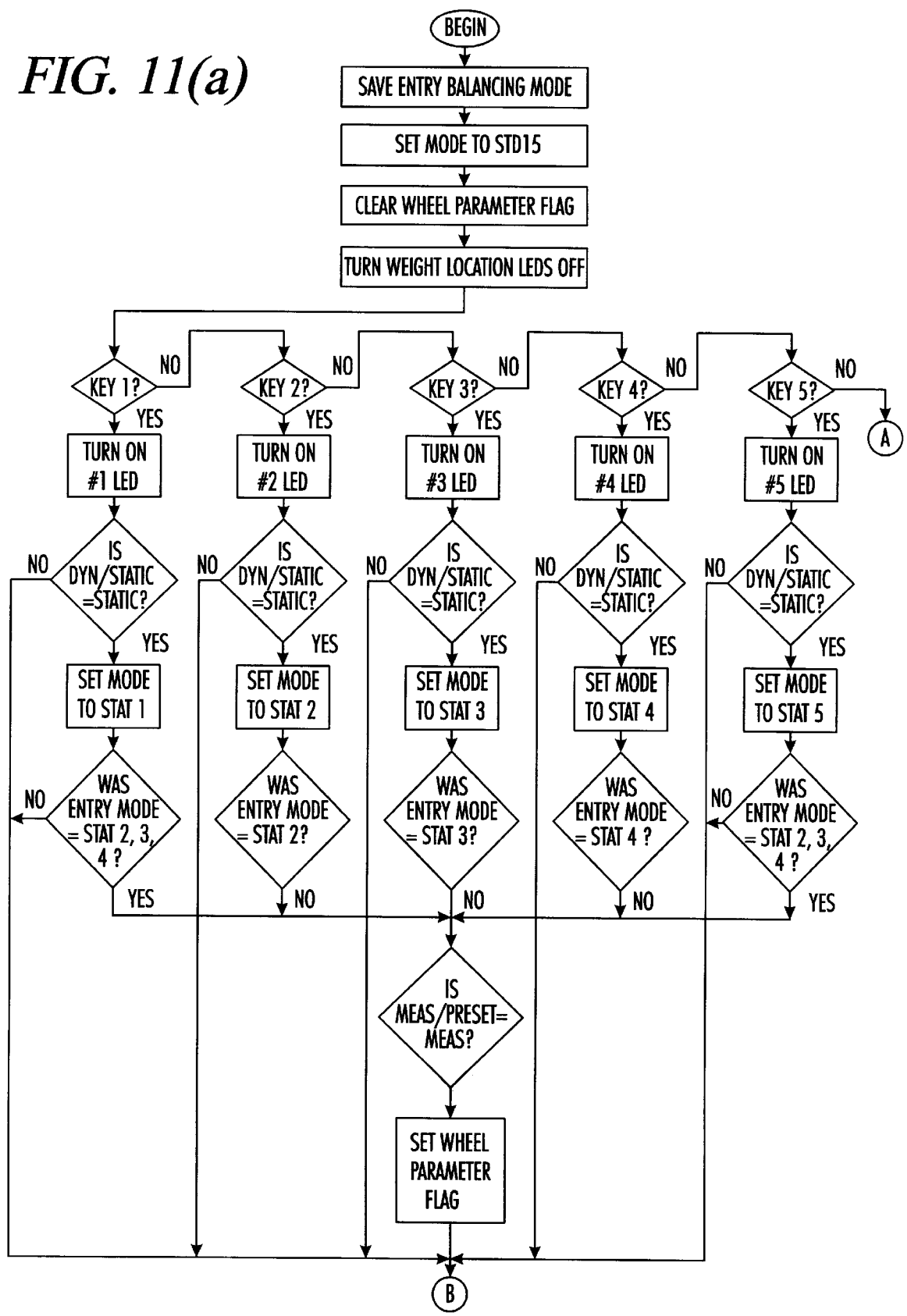
FIGS. 11(*a*), (*b*), and (*c*) are collectively a flow chart showing the sequence of steps performed by the balancer during selection by the operator of the weight correction planes to be used.
Figure 11B:
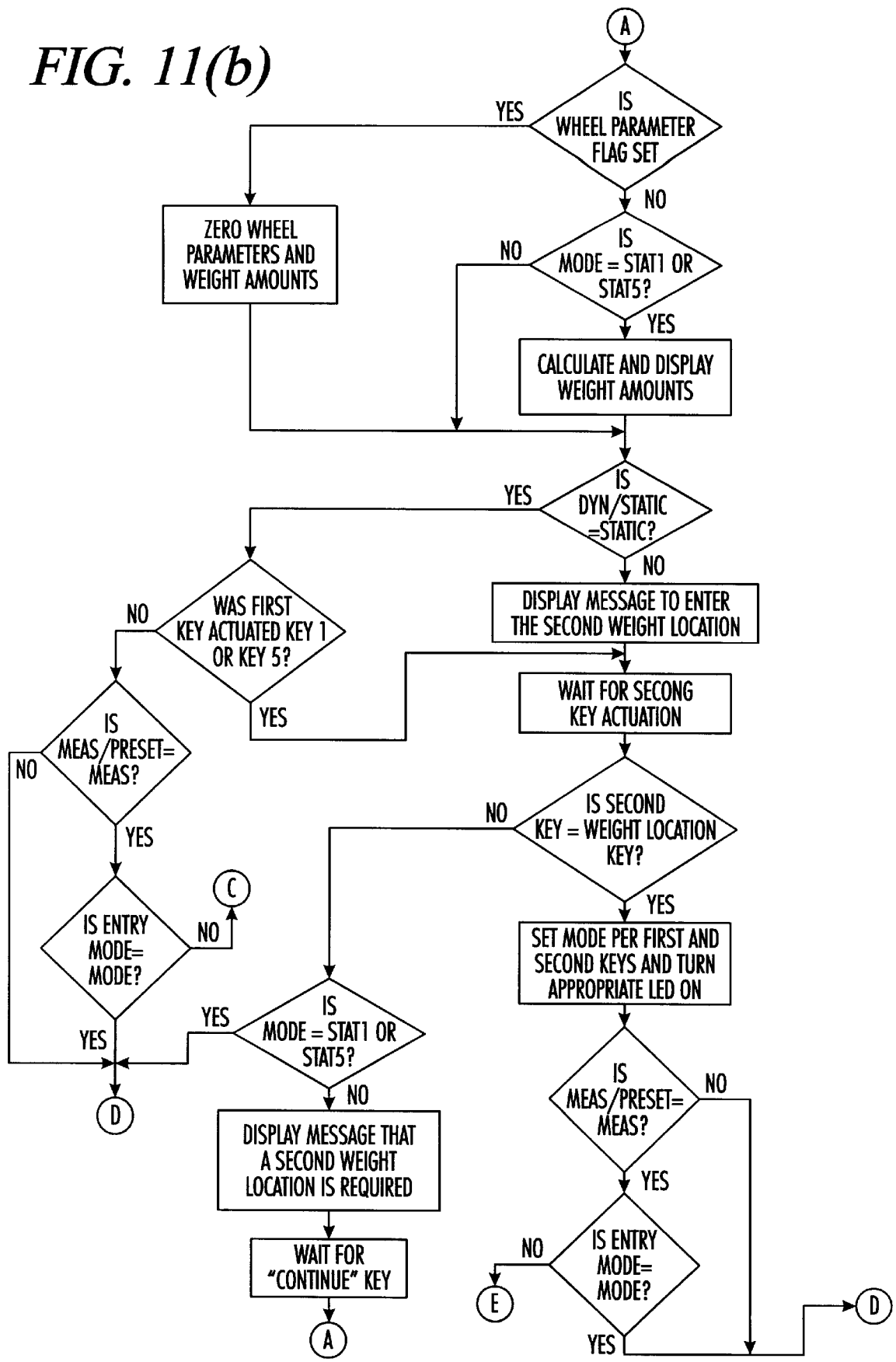
Figure 11C:
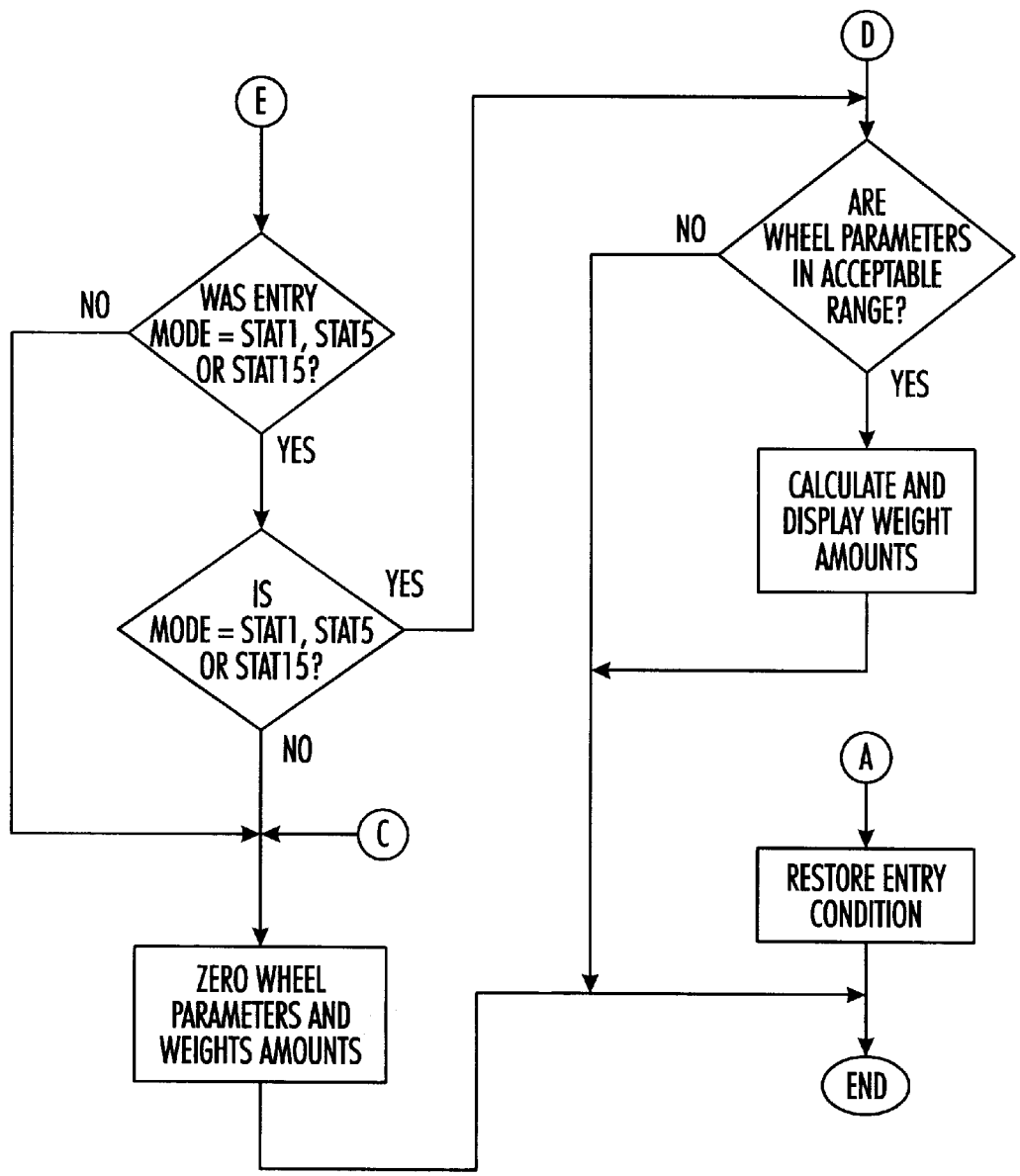

After the MEASURE/PRESET mode is checked by the main processor board 116, the sequence of steps shown on FIG. 11(b) and then FIG. 11(c) are performed. The operator enters the A and D measurements separately, and enters the width of the wheel (W) only when required. In the MEASURE mode, actual measured wheel parameters are used and data for the locations of planes 1, 2, or 3 (see FIG. 6) or the combination of two of these planes will be entered by the operator. If means are provided (such as an outside arm) to measure outside the mounting surface of the wheel, other planes can be used. Otherwise, the operator selects the location or locations of the weights to be used from planes 1, 2, and 3 and then uses A/D arm assembly 215 (FIG. 3) to measure the planes at those locations. The A/D arm 215 is held at each location until a beep is heard by the operator, and the measurements are then displayed on the display screen 102 as "AIN, DIN, AOUT, and DOUT" or "A", "W" and "D", depending on the type of weights being used.

As seen on FIG. 11(a), the main processor board 116 checks to see whether the operator has selected the DYNAMIC or STATIC balancing modes. This selection is done by the operator by pressing the mode button 215. Alloy balancing modes are automatically implemented in the DYNAMIC mode when weight locations other than the dynamic default planes (1 and 5 on FIG. 6) are selected. The DYNAMIC balancing mode calculates separate corrective weight measurements for the inner and outer planes of the wheel. Default locations are planes 1 and 5. The specific weight amount and location for each plane is calculated in a single spin.

The STATIC balancing mode calculates a single corrective weight requirement for placement at a point as close to the center of the wheel as possible (plane 3 on FIG. 6). The balancer 10 allows the operator to select any of the other locations for this weight placement simply by pressing the corresponding location button 205a. The operator may also choose to split the single weight between two planes (1 and 5) by pressing the location indicator/selection button 205 corresponding to plane 5, followed by the button 205 that corresponds to plane 1. Both location LED's 205b on location indicator/button 205 will light and the static correction weight amount will be split between the two weights displayed, as shown on weight display 202.

Variable Speed Operation

Figure 7:
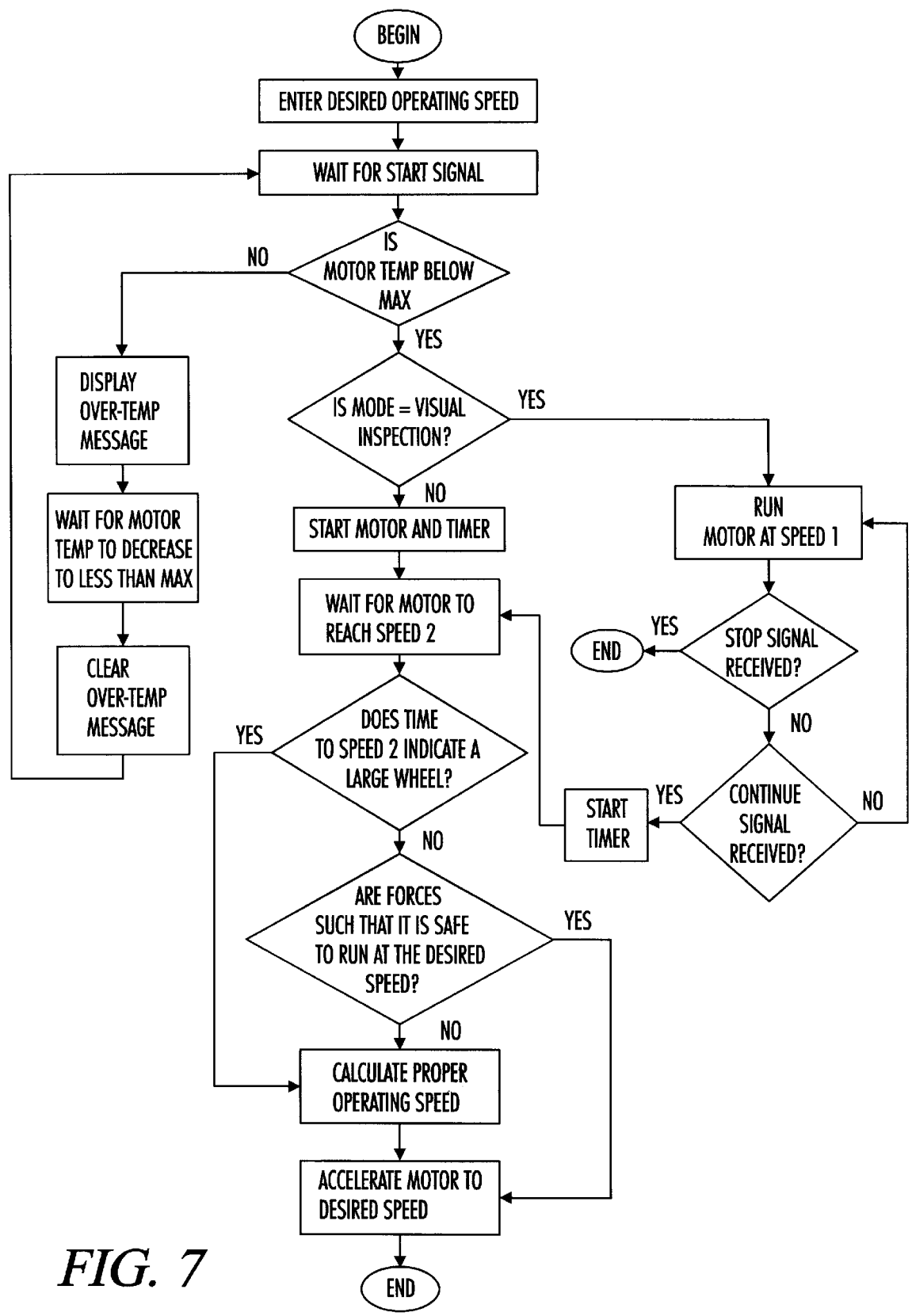
FIG. 7 is a flow chart showing the sequence of steps performed during variable speed operation of the wheel balancer of the present invention.

Looking at FIGS. 4 and 7, the novel variable speed operation of the wheel balance 10 of this invention can be understood. The method begins by the operator entering a desired operating speed for the particular wheel balancer operation on the keypad 208 at operator interface pod 21. The operator then waits for a start signal at which time the start button 105 is energized. Although the motor 47 is cooled by a fan 55 (FIG. 3), the motor temperature is monitored in conventional fashion. Accordingly, the motor 47 will not start unless the motor temperature is below the maximum. If the motor temperature is above the maximum, and an over temperature message is sent to the operator on display 102 of operator interface pod 21 until the temperature decreases to less than maximum and the over temperature message is cleared.

Once the motor temperature is below maximum, the main processor board 116 checks to see if the operator has selected a "visual inspection" mode. In this mode, the wheel and tire assembly 200 is operated at less than 120 RPM so that the hood 38 can be pivoted into the upper position. This allows the operator to visually inspect the rotating tire for run out or other defects. Thus, if the visual inspection mode is selected, the motor 47 is operated at a first speed until such time as a stop signal is received. At the conclusion of the visual inspection mode, or if the visual inspection mode is not selected, motor 47 is started. In addition, a timer integral to main processor board 116 is initialized. The timer continues to run as the speed of the motor 47 is increased to a predetermined second speed. The speed of motor 47 is measured in conventional fashion, such as by use of an optical encoder assembly 58 proximate the motor shaft. As the timer continues to operate, the measured elapsed time is compared to a predetermined time interval stored in main processor board 116. If the measured elapsed time corresponds to a predetermined time indicating a large wheel, main processor board 116 calculates a proper operating speed for a large wheel. Immediately thereafter, the main processor board 116 communicates with motor controller 117 so that the motor 47 will accelerate to the calculated desired speed. In a preferred embodiment of the balancer 10, the shaft of motor 47 is directly coupled to the face plate and stub shaft 136 such that the speed of the mounted tire and wheel assembly 200 is the same as the speed of the motor 47. If an indirect drive arrangement is used, the shaft encoder 58 or other speed sensor may have to be positioned to measure the wheel speed, not the motor speed.

If the elapsed acceleration time determined by the timer in main processor board 116 indicates that the tire and wheel assembly 200 is not a large wheel, a check is made of the imbalance forces measured by the force transducers 67. A comparison is made to preset force imbalance data stored in the main processor board 116 such that the main processor board 116 can determine if it is safe to operate the motor 47 at the higher desired speed selected by the operator. If so, the main processor board 116 causes the motor 47 to accelerate to the desired motor speed and the measurements are taken. Otherwise, the main processor board calculates a proper operating speed and accelerates the motor 47 to the calculated speed rather than to the desired speed. Thus, the balancer 10 is operated at a safe speed that is optimal to the size of the wheel that is mounted to the balancer 10. If a small wheel and tire assembly 200 is mounted, a higher operating speed can be used, thereby reducing error introduced by poor signal to noise ratio and other factors.

Auxiliary Storage

Figure 2:
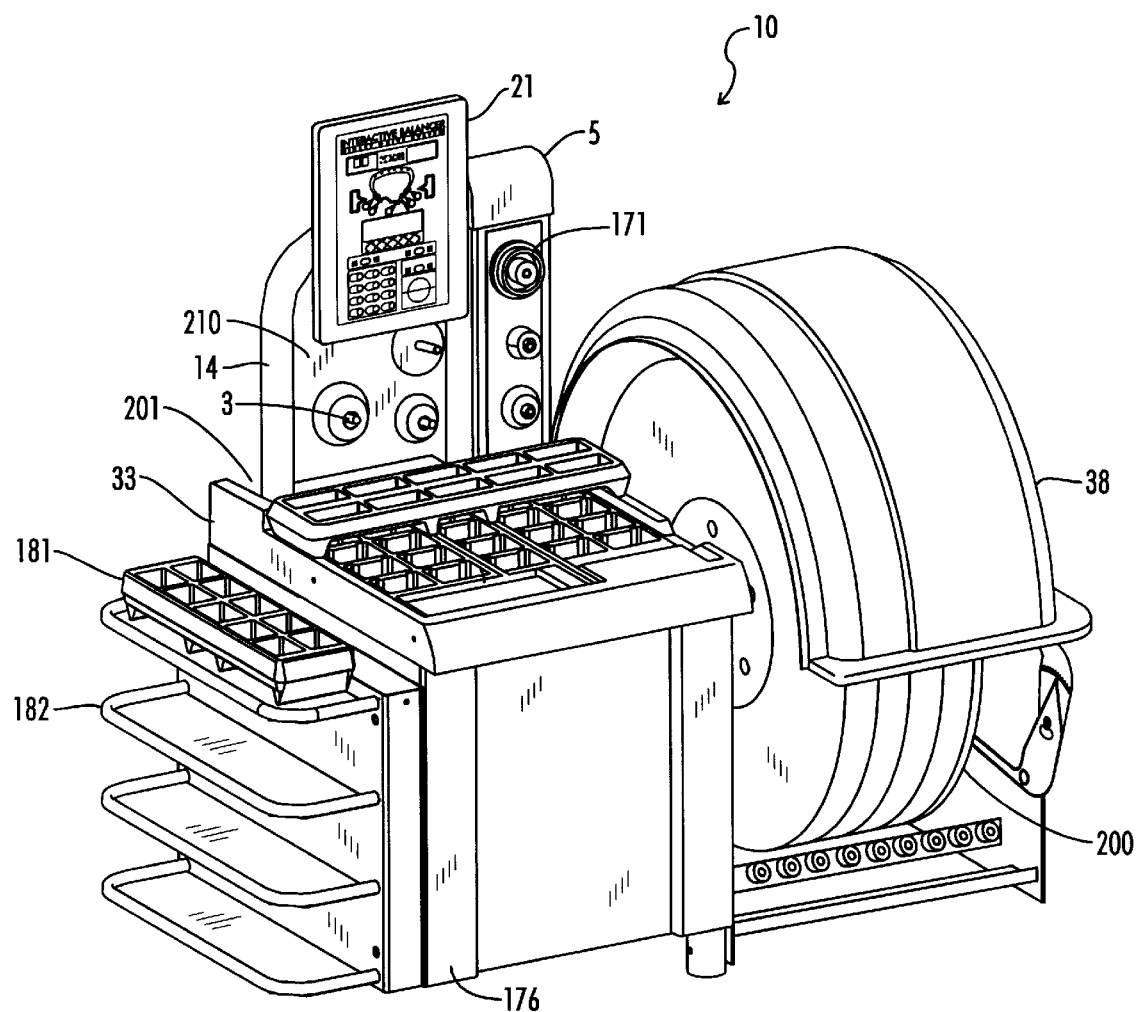
FIG. 2 is a front perspective view of a second embodiment of the wheel balancer of the present invention.
Figure 8:
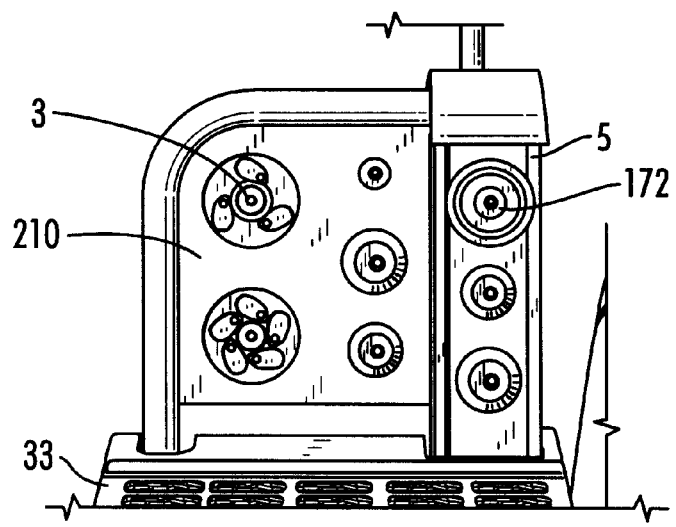
FIG. 8 is a front view of the cone storage assembly used in conjunction with the second embodiment of the wheel balancer invention of FIG. 2.

FIG. 2 shows a second embodiment of the wheel balancer 10 of the present invention having additional novel storage features. Extending upward from the rear top surface of the chassis 176 and attached between tube 14 and column 5 is a cone storage panel 210, also shown in FIG. 8. As can be seen, cone storage panel 210 has additional cone holder pegs 3 extending outwardly from the panel 210 so that cones 171 of different sizes can be stored thereon.

Figure 9:
FIG. 9 is an enlarged top perspective view of a sliding weight tray assembly used in conjunction with the second embodiment of the wheel balancer of the present invention.
Figure 10:
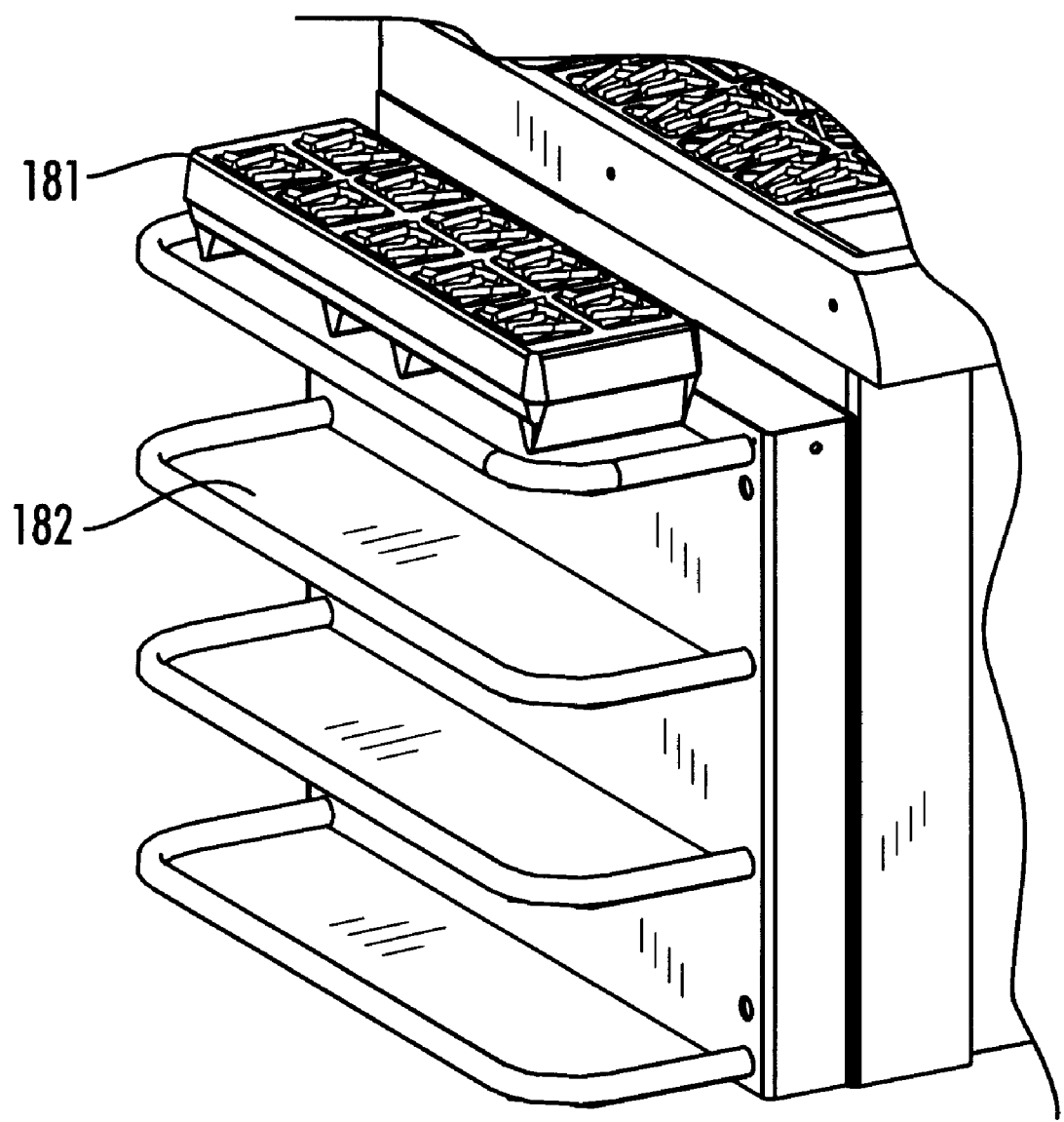
FIG. 10 is an enlarged side perspective view of the top and side tray assemblies used in conjunction with the second embodiment of the present invention.

As seen in FIG. 10, attached to the left side of chassis 176 opposite the tire and wheel assembly 200 are additional horizontal storage shelves 182 which are spaced apart from the top to the bottom of the chassis 176. An additional weight tray 181 can be placed on the top shelf 182. In fact, the weight tray 181 can be a sliding weight tray which can either rest on a shelf 182 or be placed on top of tray 33. A sliding weight tray 201 is shown in FIGS. 1 and 9 in that position. Tray 201 is removable and is adapted to slide along the left and right marginal edges of top tray 33. In this way, additional sizes and types of weights 209 (FIG. 9) can be stored in the operator's work area so that the operator will not have to go to another storage location to obtain an unusual type of weight. This speeds up the balancing process.

Thus, although there have been described particular embodiments of the present invention of a new and useful Electronic Wheel Balancer with Variable Speed Operation, Improved Operator Interface, and Auxiliary Storage, it is not intended that such references be construed as limitations upon the scope of this invention except as set forth in the following claims.

What is claimed is:

1. A machine for balancing of small and large size motor vehicle wheels by rotating one of the wheels while attached to a shaft, the shaft operably connected to a drive motor mounted to a chassis, comprising:
   a. motor controller operably connected to the drive motor;
   b. a processor electrically connected to the motor controller such that the drive motor can be started, stopped, accelerated and decelerated to a plurality of speeds controlled by the processor, including first and second wheel imbalance measurement speeds;
   a speed sensor positioned to sense the speeds of the wheel while mounted on the shaft and to communicate electrical signals to the processor that are responsive to the speed of the wheel;

c. the processor including a wheel size sensor that automatically determines the size of the wheel mounted to the shaft while the wheel is rotated;

d. the processor including a wheel speed adjuster that varies the speed of the drive motor between the first and second wheel imbalance measurement speeds in accordance with the size of wheel determined by the wheel size sensor;

e. imbalance force transducers that provide signals to the processor corresponding to the magnitude and location of imbalance forces generated by the rotating wheel; and f. wherein the wheel size sensor comprises a timer that measures an elapsed time during acceleration of the wheel from a first predetermined speed to a second predetermined speed.

2. The wheel balancer of claim 1 further comprising a motor temperature sensor electrically connected to the processor and operative to disable operation of the drive motor if a predetermined motor temperature is exceeded.

3. The wheel balancer of claim 2 further comprising a safety hood movable between a closed position over the wheel and an open position above the wheel, and the balancer having a visual inspection mode whereby the processor causes the drive motor to rotate the wheel at a low speed such that the wheel can be rotated while the safety hood is in the open position.

4. The wheel balancer of claim 3 further comprising a control panel whereby an operator of the balancer can select a desired wheel speed and wherein the processor includes a speed override calculator that determines if the imbalance forces generated at a wheel speed that is below the speed selected by the operator would permit safe operation of the balancer at the speed selected by operator.

5. The wheel balancer of claim 4, the wheel speed adjuster including a wheel speed calculator that calculates the wheel imbalance measurement speed if the wheel size sensor determines that a large size wheel is mounted to the shaft.

6. A method of automatically adjusting the speed of a motor driving a shaft in accordance with variations in size of motor vehicle wheels mounted to the shaft comprising the steps of:

a. accelerating the wheel from a first speed to a second speed;

b. measuring an elapsed time of acceleration between the first speed and the second speed;

c. comparing the measured elapsed acceleration time to one or more pre-determined times corresponding to one or more known elapsed acceleration times for known wheel sizes; and d. adjusting the speed of the motor to a speed that is determined based on the results of the comparison between the measured elapsed acceleration time and the known elapsed acceleration time.

* * * * *